(12) United States Patent
Christenson et al.

(10) Patent No.: US 7,633,362 B1
(45) Date of Patent: Dec. 15, 2009

(54) EDDY-CURRENT-DAMPED MICROELECTROMECHANICAL SWITCH

(75) Inventors: Todd R. Christenson, Albuquerque, NM (US); Marc A. Polosky, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 232 days.

(21) Appl. No.: 11/901,384

(22) Filed: Sep. 17, 2007

Related U.S. Application Data

(62) Division of application No. 10/941,447, filed on Sep. 15, 2004, now Pat. No. 7,289,009.

(51) Int. Cl.
*H01H 51/22* (2006.01)
(52) U.S. Cl. .......................................... 335/78; 200/181
(58) Field of Classification Search ................ 200/61.45 R–61.53, 181; 335/78
See application file for complete search history.

(56) References Cited

U.S. PATENT DOCUMENTS

| | | | |
|---|---|---|---|
| 4,156,366 A | 5/1979 | Euer | |
| 4,825,697 A | 5/1989 | Huber | |
| 5,501,893 A | 3/1996 | Laermer et al. | |
| 5,783,885 A | 7/1998 | Post | |
| 6,184,764 B1 | 2/2001 | Edwards | |
| 6,329,618 B1 | 12/2001 | James | |
| 6,375,759 B1 | 4/2002 | Christenson et al. | |
| 6,700,264 B2 | 3/2004 | Chu | |
| 7,142,075 B1 | 11/2006 | Roesler | |
| 7,207,102 B1 | 4/2007 | Roesler | |
| 2004/0246647 A1 | 12/2004 | Schindler | |

*Primary Examiner*—Elvin G Enad
*Assistant Examiner*—Bernard Rojas
(74) *Attorney, Agent, or Firm*—John P. Hohimer

(57) ABSTRACT

A microelectromechanical (MEM) device is disclosed that includes a shuttle suspended for movement above a substrate. A plurality of permanent magnets in the shuttle of the MEM device interact with a metal plate which forms the substrate or a metal portion thereof to provide an eddy-current damping of the shuttle, thereby making the shuttle responsive to changes in acceleration or velocity of the MEM device. Alternately, the permanent magnets can be located in the substrate, and the metal portion can form the shuttle. An electrical switch closure in the MEM device can occur in response to a predetermined acceleration-time event. The MEM device, which can be fabricated either by micromachining or LIGA, can be used for sensing an acceleration or deceleration event (e.g. in automotive applications such as airbag deployment or seat belt retraction).

11 Claims, 16 Drawing Sheets

Section 1 - 1

EDDY-CURRENT-DAMPED MICROELECTROMECHANICAL SWITCH

CROSS REFERENCE TO RELATED APPLICATIONS

This is a division of application Ser. No. 10/941,447 filed on Sep. 15, 2004 now U.S. Pat. No. 7,289,009.

This application is related to U.S. Pat. Nos. 7,207,102 and 7,142,075, both of which are incorporated herein by reference.

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to microelectromechanical (MEM) devices, and in particular to a MEM apparatus that includes a plurality of permanent magnets located proximate to an electrically-conductive substrate or a metal plate to provide an eddy current damping for movement of a shuttle in the MEM apparatus. The MEM apparatus can further include therein an electrical switch which provides a switch closure in response to the occurrence of a predetermined acceleration-time event.

BACKGROUND OF THE INVENTION

An environmental sensing device (ESD) is a device which actuates after sensing an appropriate velocity change by mechanically integrating an acceleration input over time. ESDs have applications, for example, for use in automotive airbags and for seat belt tensioners. Current ESDs are generally based on fluid or mechanical dampening. Fluid-damped ESDs can be problematic due to thermal expansion of the fluid that must be accommodated, and which can lead to eventual fluid leakage. Mechanically-damped ESDs require precision machining and piece-part assembly.

The present invention is a microelectromechanical ESD (also referred to herein a MEM apparatus or a MEM switch) which utilizes eddy-current damping to integrate an acceleration input over time thereby eliminating leakage problems and thermal expansion issues of conventional fluid-damped ESDs. The present invention can also be fabricated using MEM fabrication technologies such as surface and bulk micromachining and LIGA (an acronym based on the first letters for the German words for lithography, electroplating and injection molding) which have been extensively developed in recent years. Such MEM fabrication technologies utilized for the MEM apparatus of the present invention eliminate the need for conventional precision machining and can largely or entirely eliminate the need for piece-part assembly. Additionally, such MEM fabrication technologies utilized for the MEM apparatus of the present invention can provide size and weight reduction benefits as well as batch fabrication advantages.

These and other advantages of the present invention will become evident to those skilled in the art.

SUMMARY OF THE INVENTION

The present invention relates to a microelectromechanical (MEM) apparatus that comprises an electrically-conductive substrate; a shuttle comprising a plurality of permanent magnets, with the shuttle being suspended above the electrically-conductive substrate by a plurality of springs for movement along a path in the plane of the electrically-conductive substrate in response to an acceleration of the MEM apparatus, and with any movement of the shuttle in response to the acceleration being damped by eddy currents produced in the electrically-conductive substrate by the movement of each permanent magnet in the shuttle; and an electrical switch which is operable upon movement of the shuttle along the path in response to the acceleration. Each permanent magnet can comprise a rare-earth permanent magnet, for example, a samarium-cobalt (SmCo) permanent magnet or a neodymium-iron-boron (NdFeB) permanent magnet. A plurality of the permanent magnets can be arranged either in a one-dimensional (1-D) array, or in a two-dimensional (2-D) array, with a north-south magnetic pole alignment of each permanent magnet generally being oriented in a direction substantially perpendicular to the plane of the substrate. The substrate can comprise a metal or metal alloy substrate (e.g. a copper or copper alloy substrate), or can comprise a metal or metal alloy portion (e.g. comprising copper or an alloy thereof) located therein beneath the shuttle.

The electrical switch is generally configured to switch from a normally-open position to a closed position with movement of the shuttle along the path in response to a sensed acceleration. The electrical switch can be formed, at least in part, on the shuttle. Various configurations of the electrical switch are possible. As an example, the electrical switch can comprise a first electrical contact on the shuttle, and a second electrical contact on the substrate. As another example, the electrical switch can comprise a pair of electrical contacts on the substrate and an electrical conductor on the shuttle, with the electrical conductor completing an electrical circuit between the pair of electrical contacts upon movement of the shuttle along the path. As yet another example, the electrical switch can comprise a pair of electrical contacts on the shuttle and an electrical conductor on the substrate, with the electrical conductor completing an electrical circuit between the pair of electrical contacts upon movement of the shuttle along the path.

The present invention further relates to a microelectromechanical (MEM) apparatus, comprising a substrate holding a plurality of permanent magnets; an electrically-conductive shuttle suspended above the substrate by a plurality of springs, with the shuttle being moveable along a path in the plane of the substrate in response to an acceleration of the MEM apparatus, and with a movement of the shuttle in response to the acceleration being damped by eddy currents produced therein in response to the movement of the shuttle relative to each permanent magnet on the substrate; and an electrical switch which is operable upon movement of the shuttle along the path in response to the acceleration. Each permanent magnet comprises a rare-earth permanent magnet (e.g. comprising SmCo or NdFeB). When a plurality of permanent magnets are used, the permanent magnets can be arranged in a 1-D or 2-D array. The north-south magnetic pole alignment of each permanent magnet can be oriented in a direction substantially perpendicular to the plane of the substrate. The electrically-conductive shuttle can comprise a metal such as copper, or a metal alloy.

Various configurations of the electrical switch are possible as described previously, with the electrical switch generally being in a normally-open position with the shuttle at rest, and moving to a closed position upon sensing a predetermined acceleration-time event. The electrical switch can be formed, at least in part, on the electrically-conductive shuttle.

The present invention also relates to a microelectromechanical (MEM) apparatus which comprises a substrate; a shuttle comprising a plurality of permanent magnets suspended above the substrate by a plurality of springs, with the shuttle being moveable along a path in the plane of the substrate in response to an acceleration of the MEM apparatus, and with a movement of the shuttle in response to the acceleration being damped by eddy currents produced in a metal plate located proximate to the shuttle by the movement of the plurality of permanent of magnets in the shuttle; and an electrical switch which is operable upon movement of the shuttle along the path. The metal plate (e.g. comprising copper) can be located on or within the substrate (e.g. comprising silicon), or above the shuttle. In some embodiments of the present invention, one metal plate can be located on or within the substrate below the shuttle, and another metal plate can be located above the shuttle. The permanent magnets can comprise rare-earth (e.g. SmCo or NdFeB) permanent magnets, which can be arranged in a 1-D or 2-D array. The electrical switch can be formed, at least in part, on the shuttle.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
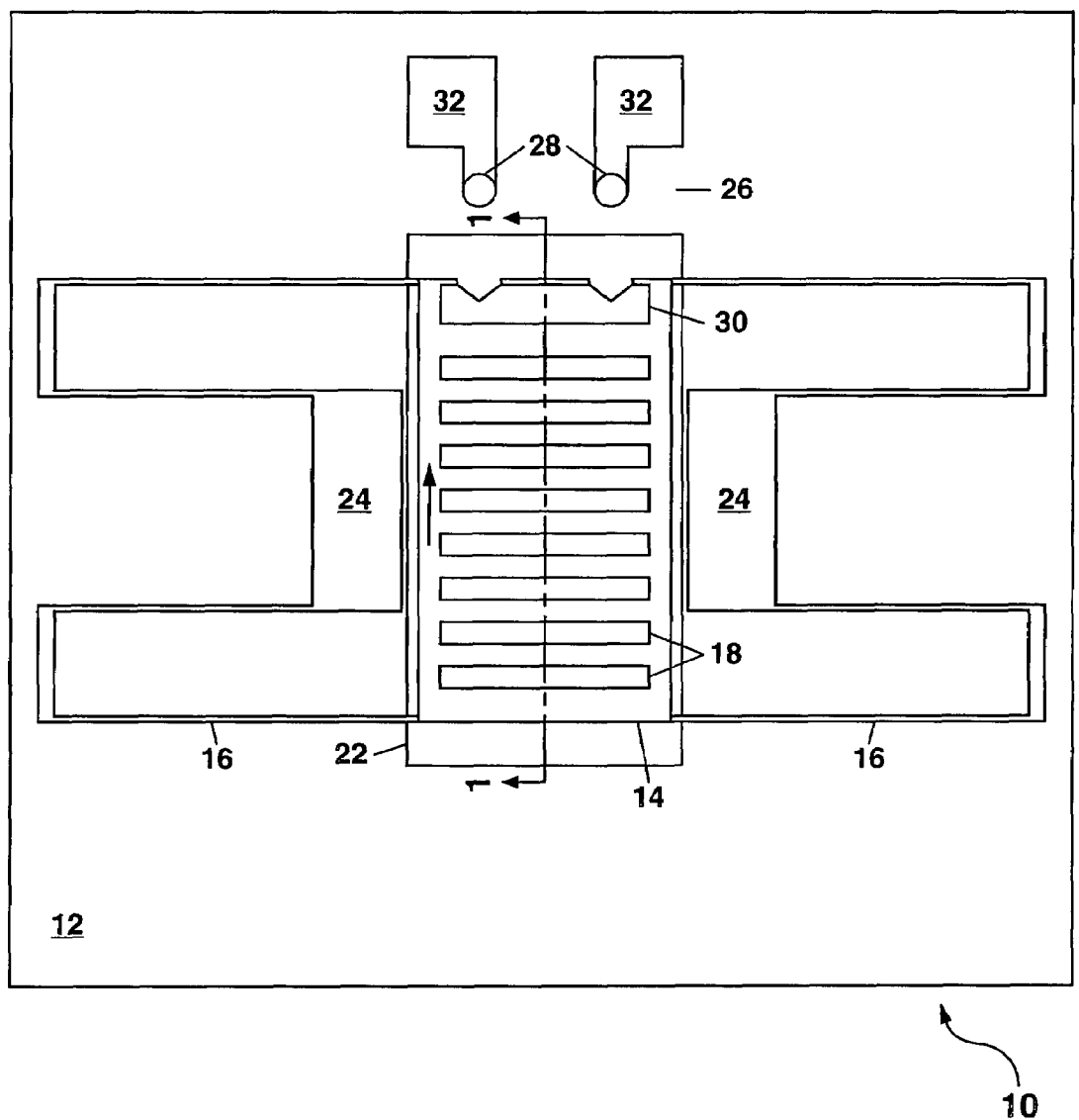
FIG. 1 shows a schematic plan view of a first example of the MEM apparatus of the present invention.

Referring to FIG. 1, there is shown a schematic plan view of a first example of a microelectromechanical (MEM) apparatus 10 which can be used as a damped acceleration switch to sense changes in velocity of any object (e.g. an automobile) to which the apparatus 10 is attached. This is done by sensing a predetermined acceleration-time product prior to closing an electrical switch therein. The term "acceleration" as used herein is intended to include both a positive acceleration (i.e. an increasing rate of change of speed), and a negative acceleration (i.e. a deceleration).

Figure 3:
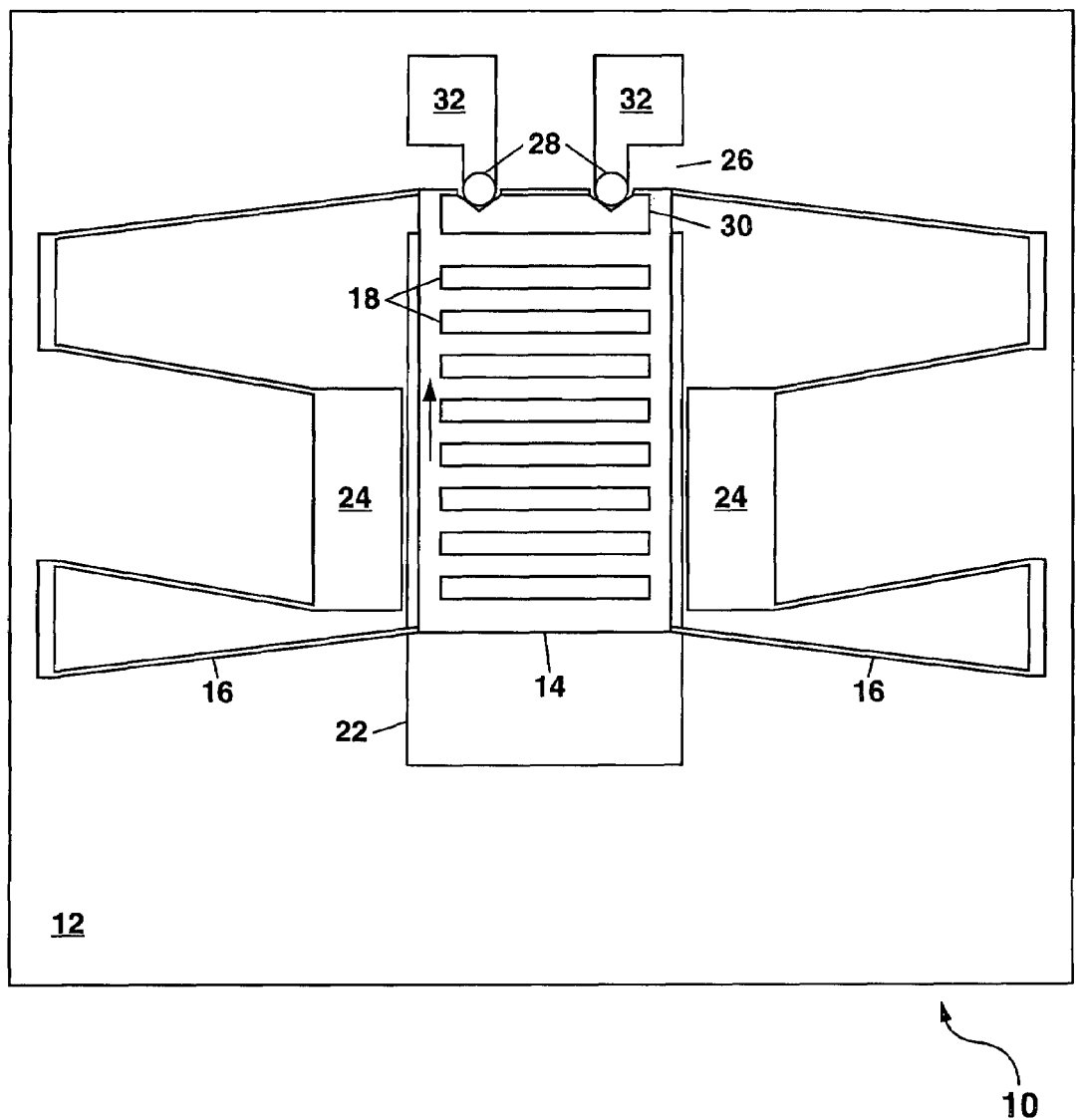
FIG. 3 shows a schematic plan view of the MEM apparatus of FIG. 1 in an actuated position wherein a switch closure is effectuated.

The MEM apparatus 10 in FIG. 1 comprises an electrically-conductive substrate 12, with a moveable shuttle 14 being suspended above the substrate 12 by a plurality of springs 16 to allow movement of the shuttle 14 along a path between an as-fabricated rest position shown in FIG. 1 and an actuated position shown in FIG. 3. In FIGS. 1 and 3, a movement of the shuttle 14 in the direction indicated by the arrow is produced in response to an oppositely-directed acceleration component. A plurality of permanent magnets 18 can be provided in the shuttle 14, with a north-south magnetic pole alignment of the permanent magnets 18 generally being oriented in a direction substantially perpendicular to a plane of the substrate 12, and with the north-south magnetic pole alignment of adjacent permanent magnets 18 being in the same direction, or in opposite directions (i.e. an alternating north-south magnetic pole alignment).

The phrase "north-south magnetic pole alignment" defines a line running between a north pole and a south pole of a particular permanent magnet 18, and further indicates at which end of that line the north pole and south pole are located. In the cross-section view of FIG. 2, which is taken along the section line 1-1 in FIG. 1, a series of up-pointing arrows indicates the location of the permanent magnets 18 all having their north poles pointing upwards.

Figure 2:
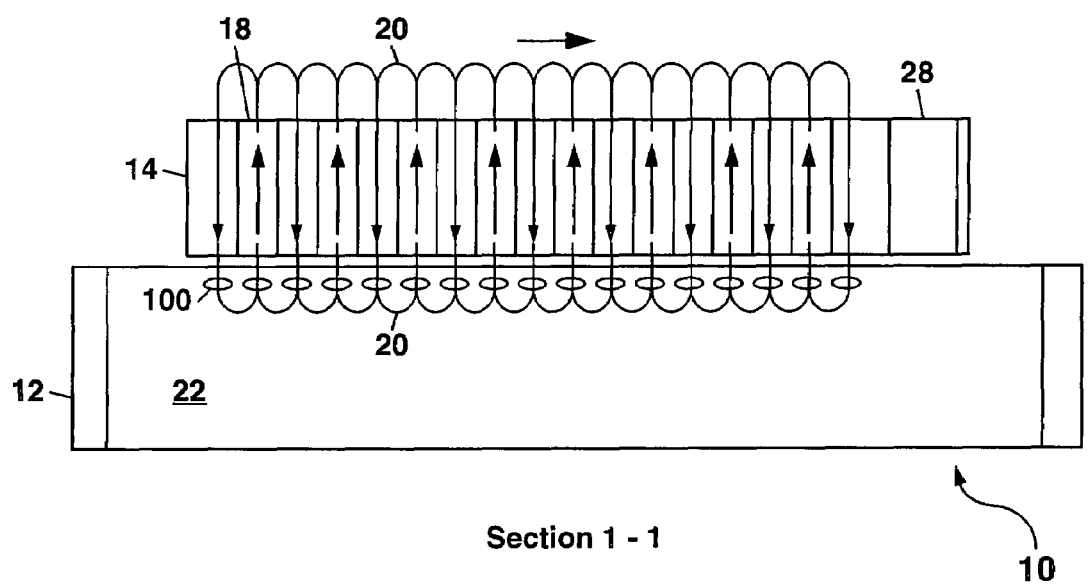
FIG. 2 shows a schematic cross-section view of the MEM apparatus of FIG. 1 along the section line 1-1 in FIG. 1.

The schematic cross-section view of FIG. 2 also shows lines of magnetic flux $\phi$ 20 which extend outward from each permanent magnet 18 and wrap around through the shuttle 14 between the permanent magnets 18 as indicated by the down-pointing arrows. The lines of magnetic flux $\phi$ 20 also extend downward into a metal portion 22 of the electrically-conductive substrate 12 to induce eddy currents 100 therein in response to any movement of the shuttle 14 and permanent magnets 18 relative to the metal portion 22. The metal portion 22, which is also referred to herein as a metal plate, can either be located within the substrate 12 as shown in FIG. 1 or located on the substrate 12 (e.g. as a deposited or plated layer). In certain embodiments of the present invention, another metal plate 72 can be supported above the substrate 12 above the shuttle 14 (see FIG. 10).

In FIG. 1, the permanent magnets 18 are spaced apart by a predetermined distance in a 1-D array, with the spacing being dependent on the exact number of permanent magnets 18 used and a length of the shuttle 14 in the direction of motion indicated by the arrow. As an example, each permanent magnet 18 can be 100 μm wide, 2 millimeters long and 275 μm thick, with a spacing between adjacent magnets 18 being equal to the width of the magnets 18. The shuttle 14 can have a length of, for example, 10 millimeters; a width of 3 millimeters; and a thickness of 275 μm.

The permanent magnets 18 can comprise any type of permanent magnets known to the art, and in particular can comprise rare-earth permanent magnets which can further comprise samarium cobalt (SmCo) or neodymium-iron-boron (NdFeB) alloys which can be formed as bonded or sintered rare-earth permanent magnets 18. These rare-earth permanent magnets 18 can be formed as described hereinafter, and can have an energy product BH of up to 10 MegaGauss-Oersted (MGOe) or more.

In the example of FIG. 1, the shuttle 14 is suspended above the substrate 12 by a plurality of springs 16 which can be folded to save space. One end of each spring 16 is attached to the shuttle 14, and the other end of each spring 16 can be attached to a support 24 on the substrate 12. The springs 16 are designed to allow movement of the shuttle 14 back and forth along the path indicated by the arrow while resisting movement in other directions.

The substrate 12 can comprise a non-magnetic electrically-conductive material (e.g. a metal or metal alloy comprising copper, silver, gold, etc.). Alternately, the substrate 12 can include a non-magnetic metal portion 22 (e.g. comprising copper, silver, gold, etc.) formed therein beneath the shuttle 14 as shown in FIG. 1, or located on the substrate 12, or above the shuttle 14 in other embodiments of the present invention. Lines of magnetic flux $\phi$ 20 produced by the permanent magnets 18 extend into the metal portion 22 as shown in FIG. 2 and this magnetic flux $\phi$ 20 generates eddy currents 100 in the metal portion 22 in response to any movement of the permanent magnets 18 and shuttle 14 relative to the metal portion 22. The eddy currents 100, in turn, generate a resistive force $F_d$ which is directed opposite to the motion of the permanent magnets 18 and shuttle 14 with a magnitude that is given by:

$$F_d \approx \frac{ktAB^2}{\rho} v$$

where t is the thickness of the metal portion 22, A is a total area of the permanent magnets 18 in the plane of the substrate 12, B is a magnetic flux density of the permanent magnets 18 which extends into the metal portion 22, $\rho$ is a resistivity of the metal portion 22, v is the velocity of movement of the shuttle 14 and permanent magnets 18, and k is a proportionality constant approximately equal to ⅓. The resistive force $F_d$ generated by the eddy currents 100 is proportional to the velocity of the shuttle 14 and acts to dampen the motion of the shuttle 14. The amount of dampening can be predetermined in the MEM apparatus 10 so that a particular acceleration-time product will be needed in order to move the shuttle 14 along the extent of its path in order to close an electrical switch 26 in the MEM apparatus 10.

In the example of FIG. 1, the electrical switch 26 comprises a pair of stationary electrodes 28 which extend above the substrate 12 in the path of the shuttle 14. The stationary electrodes 28 can be electrically insulated from the substrate 12 by an intervening layer of a dielectric material (e.g. silicon nitride or silicon dioxide) when the substrate 12 is electrically conductive. An electrical conductor 30 can also be provided on the shuttle 14 to form an electrical contact at an end thereof proximate to the stationary electrodes 28 which form additional electrical contacts for the switch 26. The switch 26 in FIG. 1 is in a normally-open position when the shuttle 14 is at rest (i.e. in the absence of an externally-applied acceleration component, and in the position shown in FIG. 1). When the MEM apparatus 10 is subjected to a predetermined acceleration environment, the switch 26 moves from the normally-open position to a closed position as the electrical conductor 30 on the shuttle 14 is urged into contact with the stationary electrodes 28. This actuated position is schematically shown in FIG. 3. The electrical conductor 30 can be shaped as shown in FIGS. 1 and 3 to increase an area of contact with the stationary electrodes 28. In other embodiments of the present invention, when the shuttle 14 is electrically conductive, the electrical conductor 30 can be dispensed with and the shuttle 14 can function to provide an electrical connection between the electrodes 28, or to one or more of the electrodes 28.

Each stationary electrode 28 in the example of FIGS. 1 and 3 is electrically connected to a contact pad 32 which can be used to attach external wires to the MEM apparatus 10. The contact pads 32 can also be used to form wire bonds between the MEM apparatus 10 and a package therefor. The contact pads 32 can be electrically insulated from the substrate 12, if needed, by an intervening dielectric layer (e.g. comprising silicon nitride or silicon dioxide). In other embodiments of the present invention, the stationary electrodes 28 can be connected to electrical wiring and circuitry formed on the substrate 12 (e.g. as an integrated circuit).

The MEM apparatus 10 in the example of FIGS. 1-3 and in other examples to be described hereinafter can be fabricated by either LIGA or micromachining. To fabricate the MEM apparatus 10 of FIGS. 1-3 using micromachining, a series of process steps can be used as described hereinafter with reference to FIGS. 4A-4K which represent schematic cross-section views along the section line 1-1 in FIG. 1.

Figure 4A:
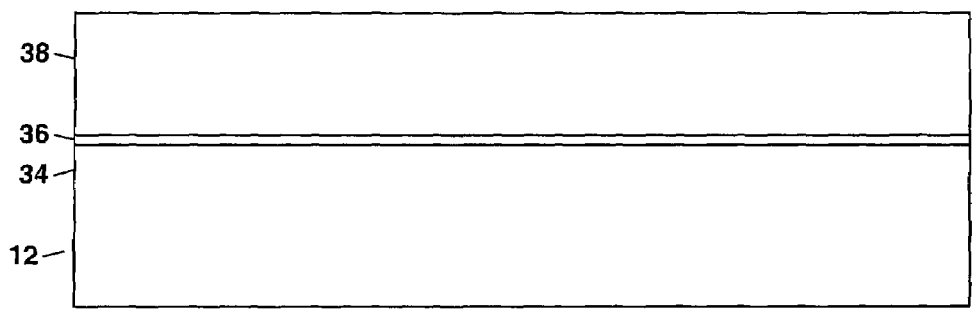
FIGS. 4A-4K show schematic cross-section views along the section line 1-1 in FIG. 1 to illustrate fabrication of the MEM apparatus by micromachining.

In FIG. 4A, a silicon-on-insulator (SOI) substrate is provided. The SOI substrate comprises a lower silicon portion 34 which can be, for example, monocrystalline silicon up to 500 μm thick. The SOI substrate further includes an insulating portion 36 which generally comprises silicon dioxide up to 200 μm thick, for example, and an upper silicon portion 38 which can be, for example, monocrystalline silicon up to 500 μm thick. The lower silicon portion 34 in combination with a metal portion 22 to be formed therein will become the electrically-conductive substrate 12 shown in FIGS. 1-3. The insulating portion 36 will be largely removed at a later stage of processing to provide a predetermined spacing between the shuttle 14 and the electrically-conductive substrate 12. The upper silicon portion 38 will be used to form various elements of the MEM apparatus 10 including the shuttle 14, the springs 16, and the supports 24.

Figure 4B:
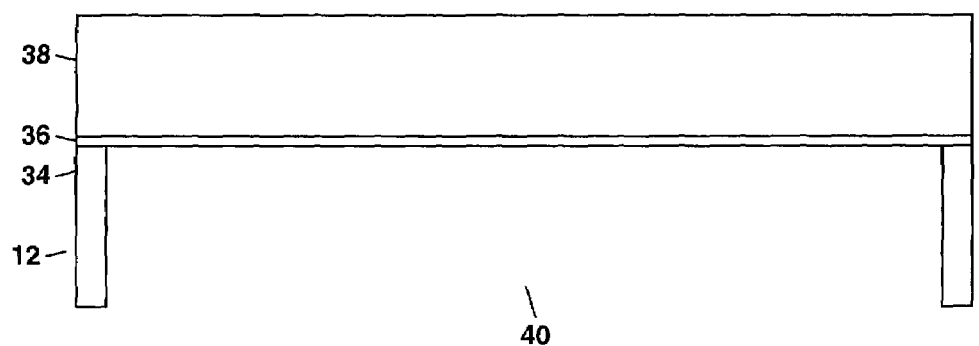

In FIG. 4B, a cavity 40 is etched completely through the lower silicon portion 34 at a location wherein the metal portion 22 is to be formed. This can be done by providing a mask (not shown) on a backside of the silicon portion 34 and then etching away the silicon through a photolithographically-formed opening in the mask. The cavity 40 with substantially-vertical sidewalls as shown in FIG. 4B can be formed using reactive ion etching; whereas wet etching as known to the semiconductor art can be used to form a cavity 40 with curved or angled sidewalls depending upon whether the wet etching is isotropic or anisotropic. Particular precision is not required for etching the cavity 40. All that is required is that the etching be terminated upon reaching the insulating portion 36. This can be done by timing the etch, or by utilizing a selective etchant as known to the art which dissolves silicon while not chemically attacking the silicon dioxide insulating portion 36.

Figure 4C:
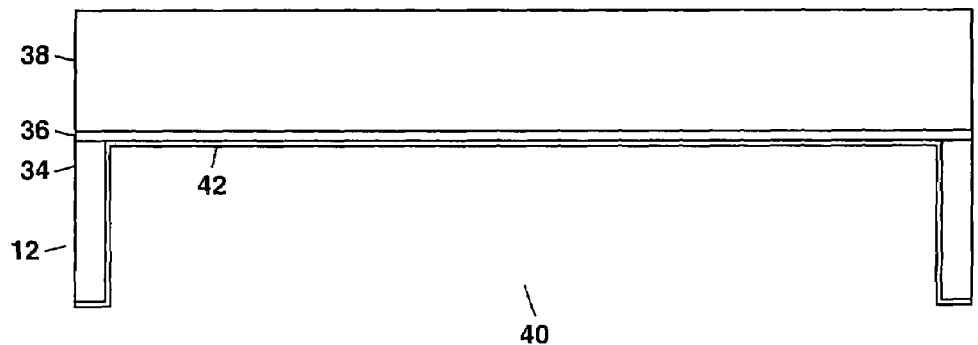

In FIG. 4C, a seed layer 42 of metal (e.g. copper or silver) can be deposited in the cavity 40 by evaporation or sputtering. This can be done after removing the mask used for the etching by blanket depositing the seed layer 42 over the backside of the lower silicon portion 34 and in the cavity 40.

Figure 4D:
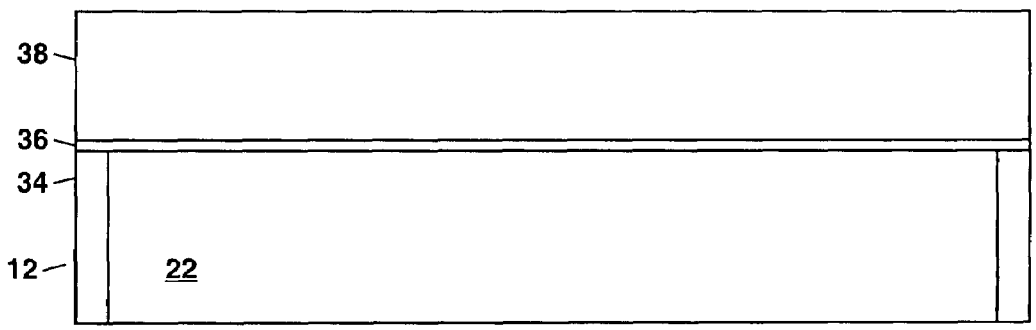

In FIG. 4D, metal (e.g. copper, silver, gold, or an alloy thereof) can be electroplated to fill in the cavity 40. Any of the metal extending outside of the cavity 40 can be optionally removed by a lapping (i.e. polishing) step to provide a substantially planar backside for the substrate 12 as shown in FIG. 4D.

Figure 4E:
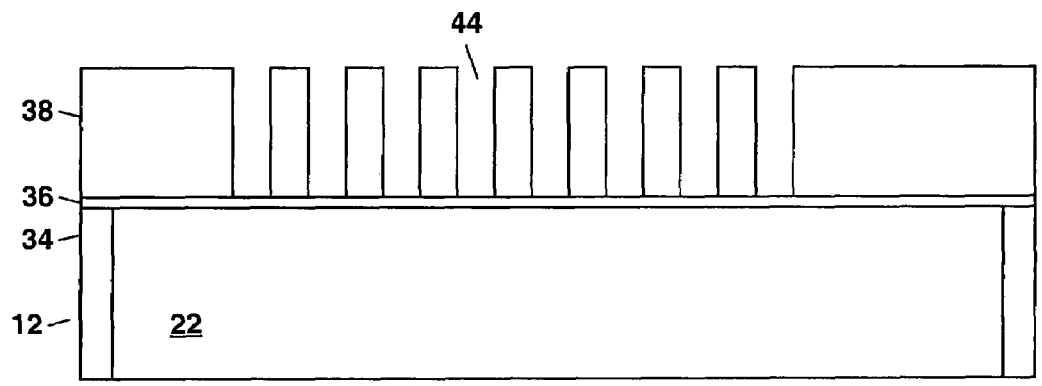

In FIG. 4E, a plurality of openings 44 can be etched completely through the upper silicon portion 38 to the underlying insulating layer 36. This step can be performed by providing a photolithographically-defined etch mask (not shown) over the upper silicon portion 38 and then etching the openings 44 using reactive ion etching. These openings 44 can be slotted as shown in the example of FIG. 1, or alternately circular or polygonal or any other shape desired for forming a 1-D or 2-D array of the permanent magnets 18.

To form the openings 44 with substantially vertical sidewalls, a deep reactive ion etch (DRIE) process such as that disclosed in U.S. Pat. No. 5,501,893 to Laermer, which is incorporated herein by reference, can be used. This DRIE process utilizes an iterative Inductively Coupled Plasma (ICP) deposition and etch cycle wherein a polymer etch inhibitor is conformally deposited as a film over the etched portions of the upper silicon portion 38 during a deposition cycle and subsequently removed during an etching cycle. The DRIE process produces substantially vertical sidewalls for the openings 44 with little or no tapering. This DRIE process can also be used to form other elements in the upper silicon portion 38 including the springs 16 and supports 24.

Figure 4F:
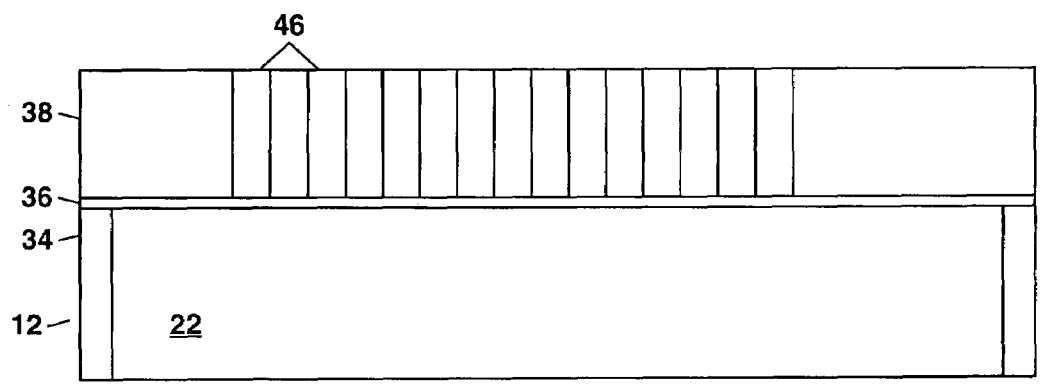

In FIG. 4F, a magnetic material 46 can be inserted into each opening 44 for use in later forming the permanent magnets 18. The magnetic material 46 is generally in an unmagnetized state at this point, and will later be magnetized to complete the formation of the permanent magnets 18. The magnetic material 46 can comprise a rare-earth magnetic material such as neodymium-iron-boron (NdFeB) or samarium-cobalt (SmCo). The magnetic material 46 can be provided, for example, as a rapidly-quenched powder with a sub-micron grain size which can be mixed with a binder material such as an epoxy or a polymer, with this mixture then being inserted into the openings 44. This can be done by many different well-known processes including calendering, doctor-blading, pressing, squeegeeing, injection molding etc., as disclosed by Christenson in U.S. Pat. No. 6,375,759 which is incorporated herein by reference. Once in place, the magnetic material 46 can then be hardened (e.g. by a curing, sintering or thermosetting step). Any of the magnetic material 46 extending above the upper silicon portion 38 can be removed in a hardened state by another lapping step.

In other embodiments of the present invention, the magnetic material 46 can be inserted into the openings 44 as a solid material such as a bonded or sintered rare-earth magnetic material. This can be done, for example, by pressing the solid magnetic material 46 into the openings 44 or by using an adhesive (e.g. epoxy) to attach the solid magnetic material 46 in the openings in the upper silicon portion 38. In yet other embodiments of the present invention, the magnetic material 46 can be deposited into the openings by evaporation, sputtering or electroplating.

Figure 4G:
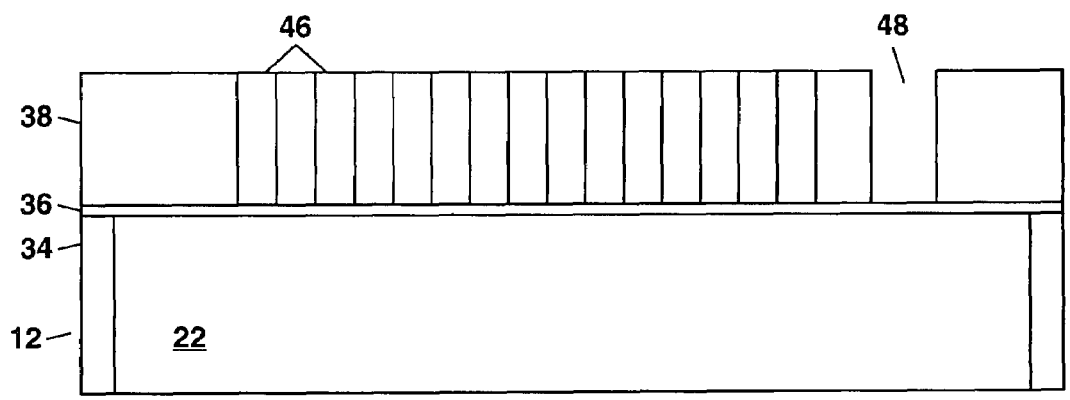
Figure 4H:
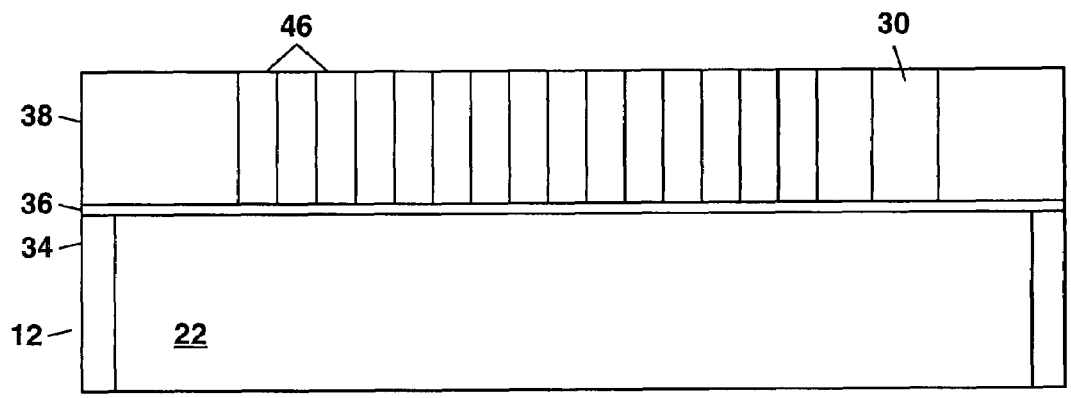

In FIG. 4G, additional openings 48 can be formed partially or completely through the upper silicon portion 38 at the locations where the electrical conductor 30 and the electrodes 28 are to be formed. These openings 48 can be formed in a manner similar to the openings 44 after providing a photolithographically-defined etch mask (not shown) over the upper silicon portion 38 and over the magnetic material 46. A metal (e.g. copper, silver or gold, or an alloy thereof) used to form the electrical conductor 30 and electrodes 28 can then be electroplated into the opening 48 in FIG. 4H. This can be done in a manner similar to that previously described with reference to FIGS. 4C and 4D (e.g. by first depositing a seed layer, electroplating with metal to fill the opening 48, and polishing away any excess metal above the opening 48, if needed).

It should be noted that the ordering of the process steps described with reference to FIGS. 4B-4H is provided by way of example and not by way of limitation. Those skilled in the art will understand that, if desired, the magnetic material 46 can be formed in the upper silicon portion prior to forming the metal portion 22, the electrical conductor 30 and the electrodes 28. Alternately, the metal portion 22, electrical conductor 30 and electrodes 28 can be formed prior to insertion of the magnetic material 46 into the openings 44. It is also possible to electroplate the metal portion 22, electrical conductor 30 and electrodes 28 in a single electroplating step when these elements comprise the same metal.

Figure 4I:
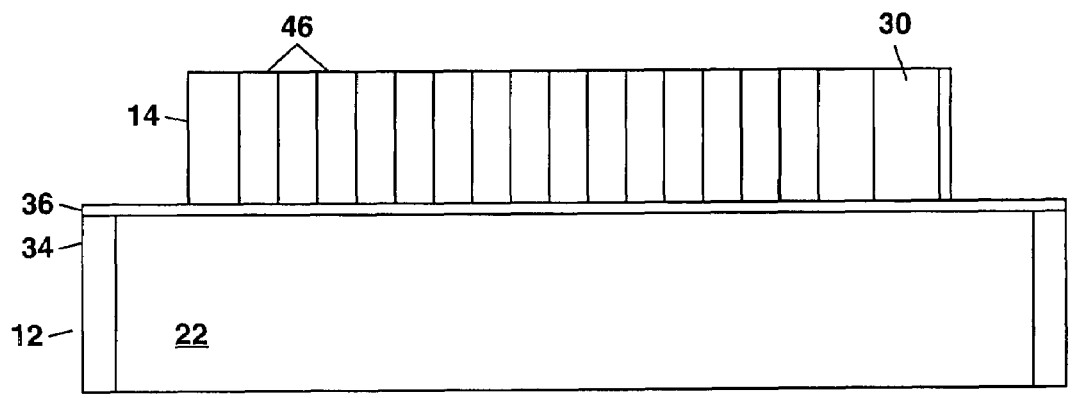
Figure 4J:
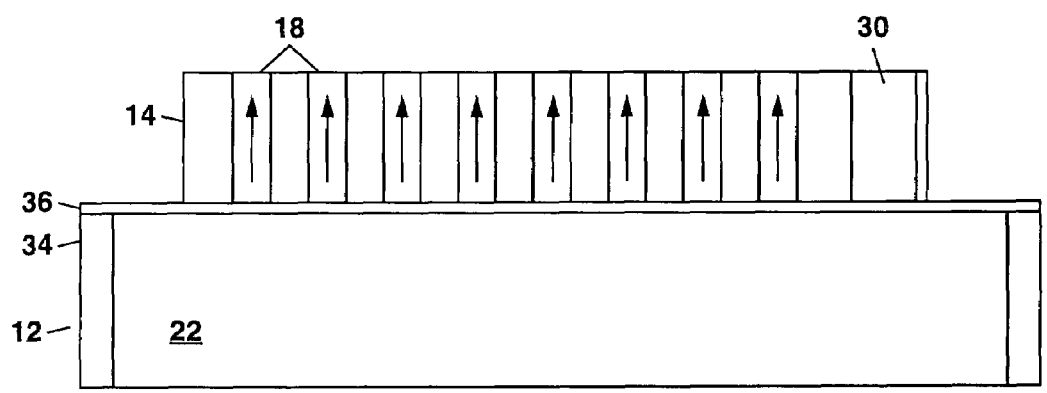

In FIG. 4I, another photolithographically-defined etch mask (not shown) can be formed over the top of the upper silicon portion 38; and another reactive ion etching step (e.g. using DRIE as described above) can be performed to define the structure of various elements of the MEM apparatus 10 to be formed from the upper silicon portion 38 including the shuttle 14, the springs 16, and the supports 24.

The springs 16 can have a width of up to 25 μm, for example, with the exact width of the springs 16 being dependent upon an acceleration environment in which the MEM apparatus 10 is to be used. A portion of each spring 16 which extends in the direction of movement of the shuttle 14 can be thickened to 50 μm, for example, as shown in FIGS. 1 and 3. This helps to limit any bending of the springs 16 to those portions thereof which are oriented substantially perpendicular to the direction of movement of the shuttle 14. The height of the springs 16 is generally equal to the thickness of the upper silicon layer 38 to provide a high aspect ratio of height to width which is useful to limit any out of plane movement of the shuttle 14. The springs 16 can also be folded as shown in FIGS. 1 and 3 to save space, with an overall length of the springs 16 generally being on the order of a few millimeters or less.

The supports 24 can have lateral dimensions up to a few millimeters on a side and are generally centered about a rest position of the shuttle 14 as shown in FIG. 1. The supports 24 are attached to the substrate 12 through a portion of the intervening insulating layer 36 which is retained after completion of the MEM apparatus 10, and function to suspend the shuttle 14 above the substrate 12 via the springs 16. The supports 24 also act to guide the shuttle 14 to move in the direction indicated by the arrow in FIG. 1.

Once the elements of the MEM apparatus 10 have been defined in the upper silicon layer 38 as shown in FIG. 4I, the magnetic material 46 can be permanently magnetized to saturation using a high magnetic field (e.g. a pulsed magnetic field having a magnetic field strength of about 30 kOe or more). This forms a plurality of permanent magnets 18 each having a north-south magnetic pole alignment which is directed substantially perpendicular to the substrate 12 as indicated by the upward-pointing arrows in FIG. 4J. An energy product BH for each permanent magnet 18 can be, for example, about 10 MegaGauss-Oersted (MGOe) when the permanent magnets 18 comprise rare-earth permanent magnets.

The contact pads 32 can now be formed as shown in FIG. 1 to provide an electrical connection to each electrode 28. This can be done by providing a photolithographically-defined mask over the substrate 12 with openings at the locations where the contact pads are to be formed, or alternately by using a shadow mask. Metal (e.g. aluminum, copper, gold, silver or alloys thereof) can then be deposited by evaporation or sputtering to form the contact pads 32.

Figure 4K:
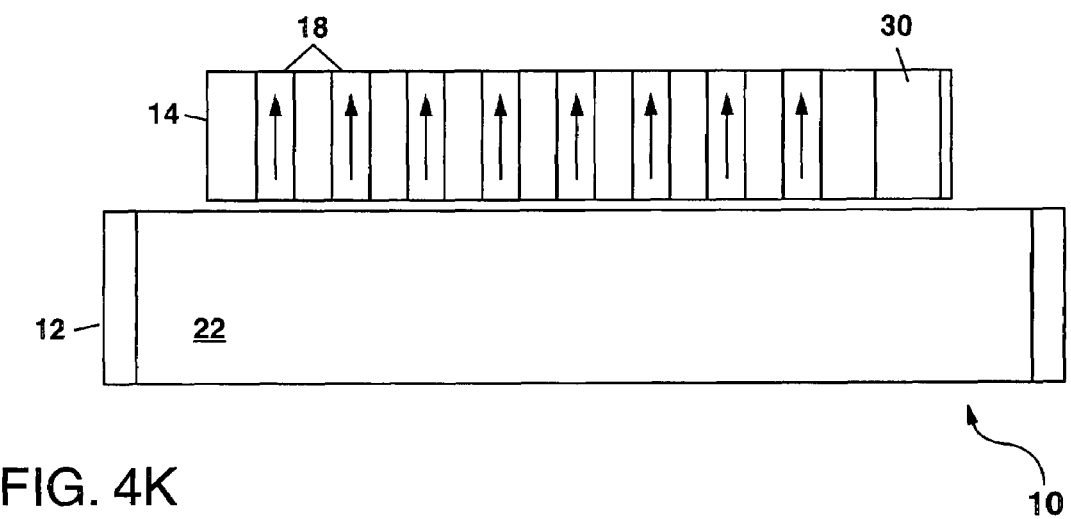

In FIG. 4K, the insulating layer 36 can be removed from underneath the shuttle 14 and the springs 16 to release these elements for movement. This can be done by immersing the substrate 12 into a wet etchant comprising hydrofluoric acid (HF). The HF etches away the silicon dioxide insulating layer 36 over time, but does not substantially etch away other materials used to form the MEM apparatus 10, including the silicon, the various metals, the magnetic material, or any silicon nitride. This etching step can be timed to limit etching of the silicon dioxide insulating layer 36 underlying the supports 24 and also to limit etching underneath the contact pads 32. A plurality of micron-sized access holes (not shown) can also be optionally formed through the shuttle 14 during DRIE etching thereof as described previously with reference to FIG. 4I in order to aid in removal of the silicon dioxide underlying the shuttle 14.

Although the example of FIGS. 1-3 has been described with reference to micromachining of silicon and silicon dioxide, those skilled in the art will understand that other micromachineable materials can be used to form the MEM apparatus 10 including semiconductors, glass, fused silica, quartz, ceramic, metal and metal alloys.

Figure 5:
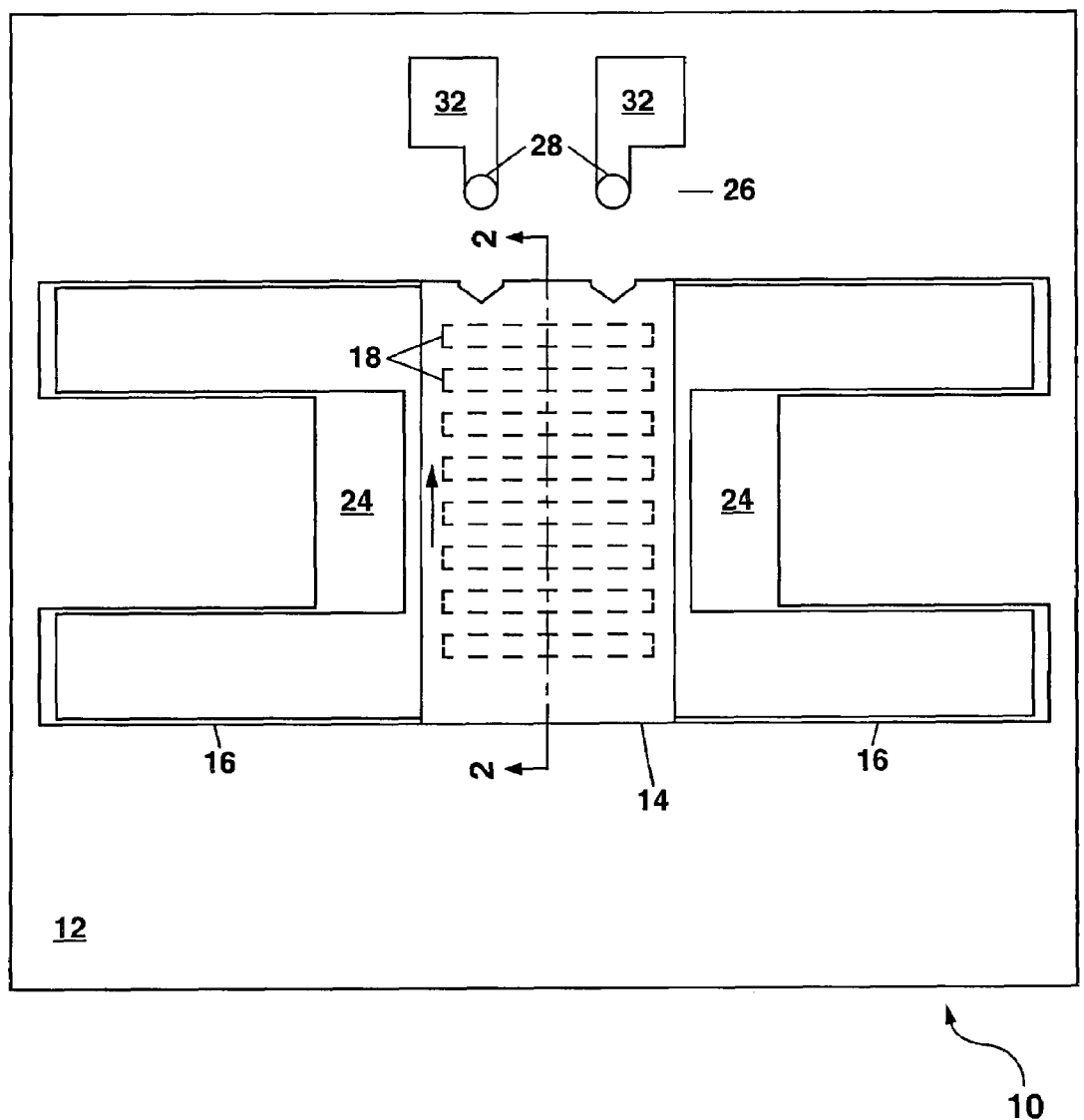
FIG. 5 shows a schematic plan view of a second example of the MEM apparatus of the present invention.
Figure 6:
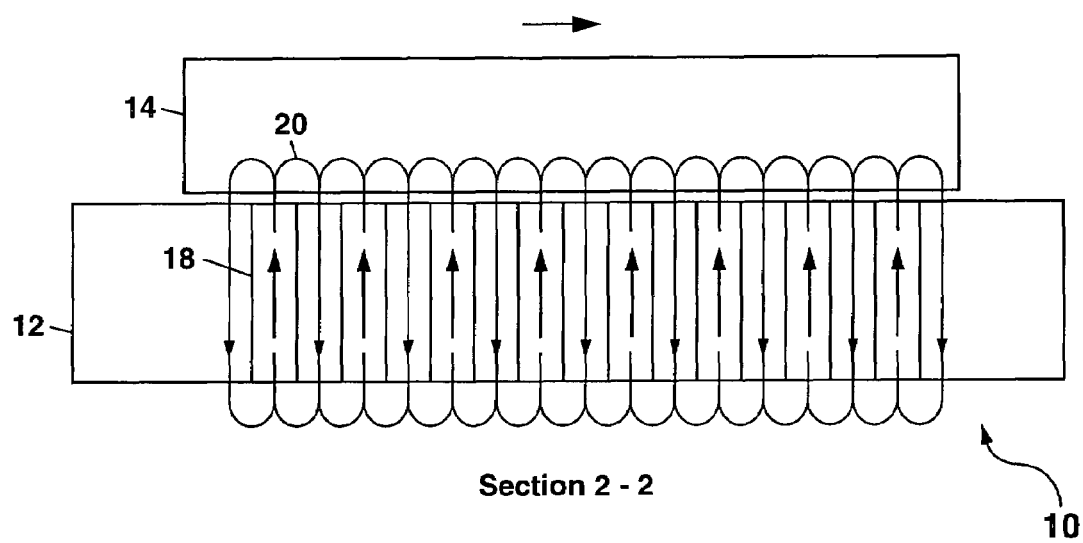
FIG. 6 shows a schematic cross-section view of the MEM apparatus of FIG. 5 along the section line 2-2 in FIG. 5.

FIGS. 5 and 6 show schematic plan and cross-section views of a second example of the MEM apparatus 10 which is similar to that of FIGS. 1-3 except that an electrically-conductive shuttle 14 is provided which eliminates the need for the metal portion 22 and the electrical conductor 30 in the example of FIGS. 1-3. Additionally, the permanent magnets 18 in the example of FIGS. 5 and 6 are located in the substrate 12 instead of in the shuttle 14. In FIG. 5, the locations of the permanent magnets 18 which underlie the metal portion 22 are indicated by dashed lines. This second example of the MEM apparatus 10 can be formed by micromachining starting with an SOI substrate using a series of process steps similar to those described previously with reference to FIGS. 4A-4K. By forming the shuttle 14 of an electroplated metal (e.g. copper, silver or gold, or an alloy thereof) there is no need for a separate metal portion 22 and electrical conductor 30. Alternately, the shuttle 14 can be formed from the upper silicon portion 38 with a separate metal portion 22 and electrical conductor 30 formed therein by a single electroplating step which can also be used to form the electrodes 28.

In the example of FIGS. 5 and 6, the 1-D array of permanent magnets 18 can be formed as described previously with reference to FIGS. 4E-4F and FIG. 4J. The magnetic flux $\phi$ 20 extends upward from the permanent magnets 18 into the shuttle 14 as shown in FIG. 6 to generate an eddy-current damping of the electrically-conductive shuttle 14 in response to a movement of the shuttle 14 in the direction indicated by the arrows in FIGS. 5 and 6. After experiencing a predetermined acceleration-time event, the shuttle 14 in the example of FIGS. 5 and 6 will be urged into contact with the electrodes 28 thereby effecting a switch closure in the MEM apparatus 10. An end of the shuttle 14 proximate to the electrodes 28 can be shaped as shown in FIG. 5 to increase an area of contact between the shuttle 14 and the electrodes 28.

Figure 7:
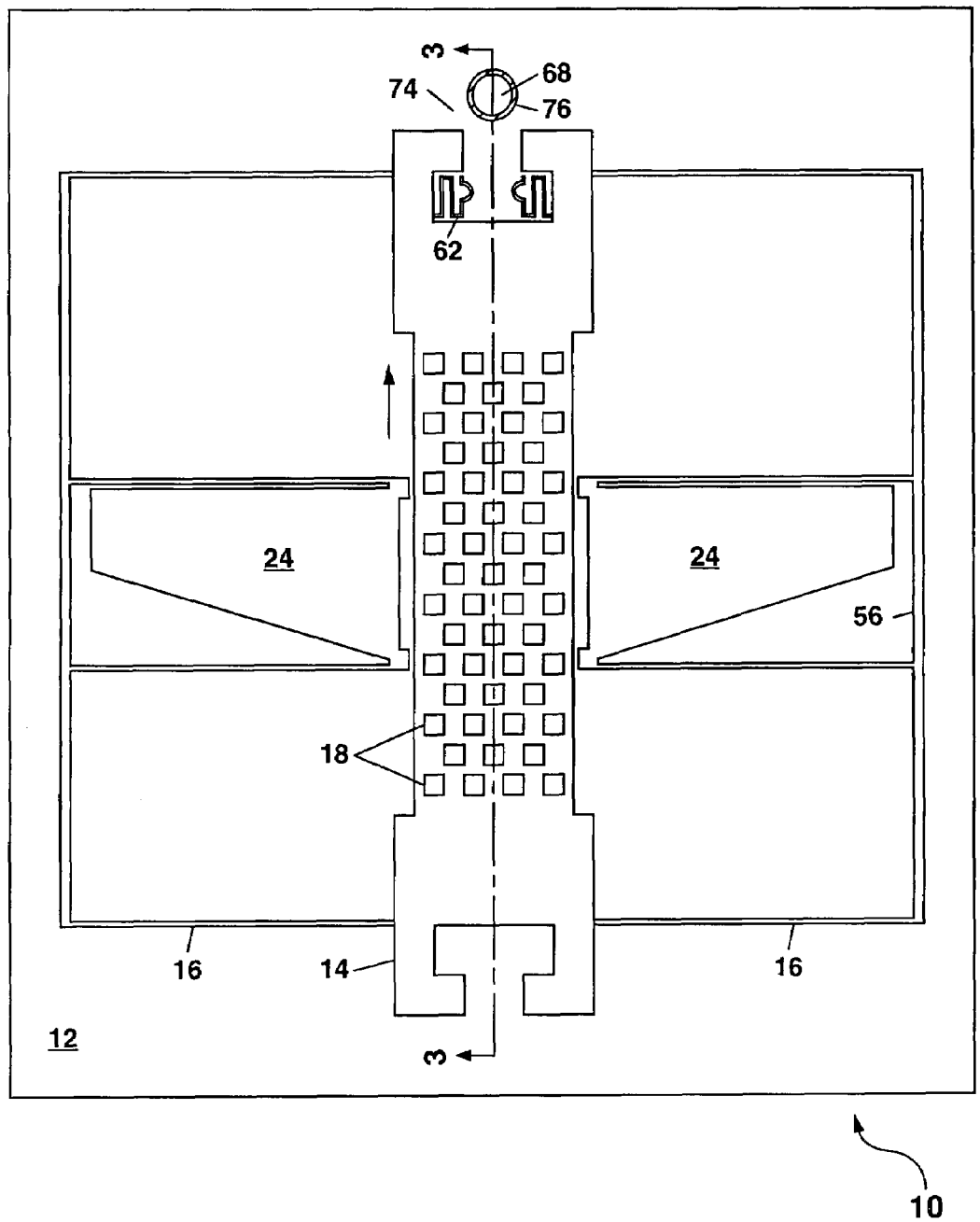
FIG. 7 shows a schematic plan view of a third example of the MEM apparatus of the present invention.
Figure 8:
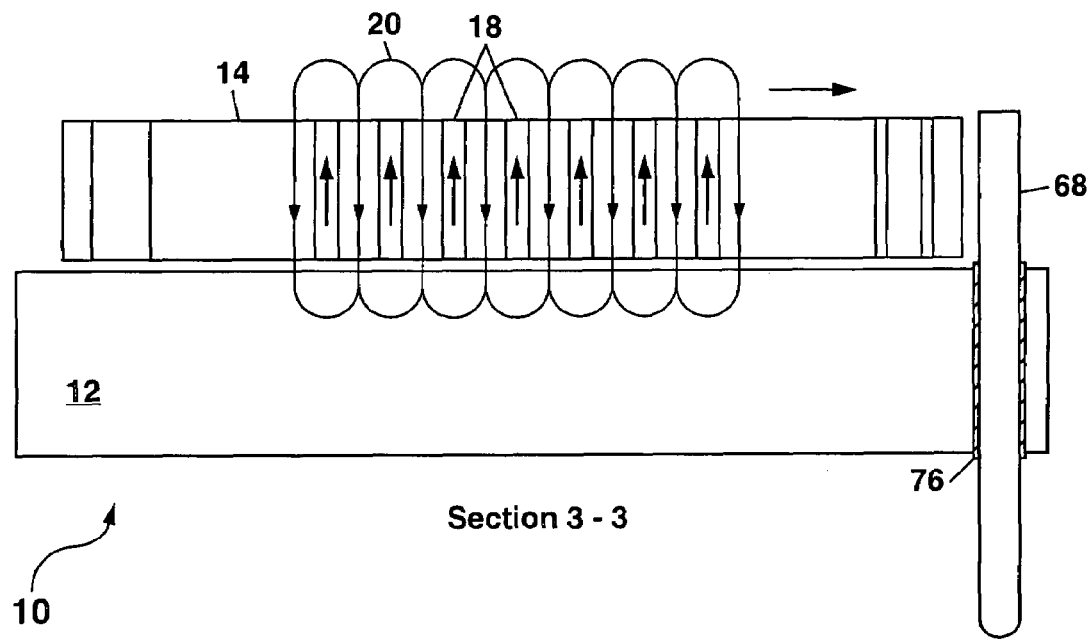
FIG. 8 shows a schematic cross-section view of the MEM apparatus of FIG. 7 along the section line 3-3 in FIG. 7.

FIGS. 7 and 8 schematically illustrate a third example of the MEM apparatus 10 of the present invention. This example of the present invention will be described in terms of fabrication using LIGA although those skilled in the art will understand that each example of the MEM apparatus 10 of the present invention can be fabricated using either LIGA or micromachining. In the third example of the present invention, the MEM apparatus 10 comprises a 2-D array of spaced-apart permanent magnets 18.

Fabrication of the third example of the MEM apparatus 10 using a series of LIGA process step will be described hereinafter with reference to FIGS. 9A-9K which show schematic cross-section views along the section line 3-3 in FIG. 7.

Figure 9A:
FIGS. 9A-9K show schematic cross-section views along the section line 3-3 in FIG. 7 to illustrate fabrication of the third example of the MEM apparatus by LIGA.

In FIG. 9A, an electrically-conductive substrate 12 is provided which can comprise, for example, a metal plate formed of copper or an alloy thereof. The copper substrate 12 can be coated on all sides with a thin (e.g. ≦1 μm thick) coating of a metal (e.g. titanium, chromium, niobium or vanadium) which can be deposited by electroplating, evaporation or sputtering. This coating (not shown) protects the substrate 12 against a subsequent wet etching step which will later be used to remove a sacrificial layer 50 used during fabrication of the apparatus 10.

In other embodiments of the present invention, the substrate 12 can include a metal plate (also termed herein a metal portion) within the substrate 12 as previously described with reference to FIG. 1. Alternately, the metal plate can be formed on the substrate 12 (e.g. as a deposited or bonded metal layer).

Figure 9B:
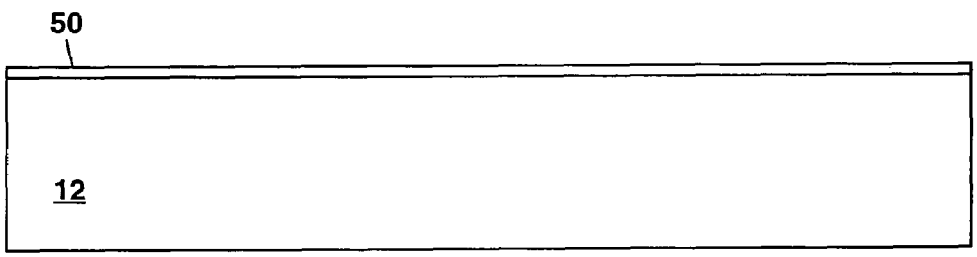

In FIG. 9B, the sacrificial layer 50, which can comprise copper, is formed over a top surface of the substrate 12. This can be done by electroplating, evaporation or sputtering, with the copper sacrificial layer 50 being, for example, 2 μm thick.

Figure 9C:
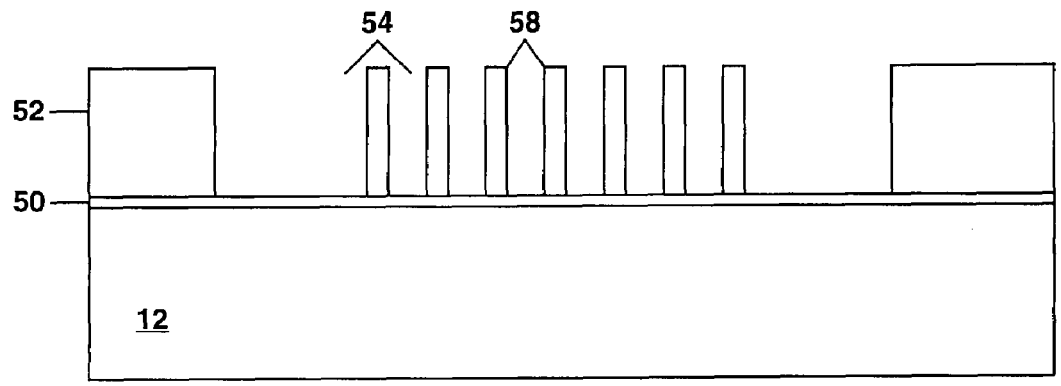

In FIG. 9C, a mask 52 is formed over the substrate 12 and sacrificial layer 50. The mask 52 can comprise a positive tone resist such as polymethymethacrylate (PMMA), or alternately a negative tone x-ray resist (e.g. Japan Synthetic Rubber Co., resist no. NFR-015). The mask 52 can be exposed to a reticle pattern using deep x-ray lithography (e.g. using a deep x-ray source such as a synchrotron) and subsequently developed to form a plurality of openings 54 through to the underlying sacrificial layer 50 at the locations wherein the shuttle 14, the springs 16, the supports 24, and the contact springs 62 of the MEM apparatus 10 are to be formed. The mask 52, which preferably has a thickness that is substantially equal to or greater than the thickness of the various elements 14, 16, 24 and 62 being formed on the sacrificial substrate 50, acts as a mold wherein the elements 14, 16, 24 and 62 can be build up by electroplating a metal or metal alloy into the openings 54. As an example, the thickness of the mask 52 can be 275 μm. An opening 54 in the mask 52 wherein the shuttle 14 is to be formed can have lateral dimensions of 3 millimeters×10 millimeters, for example. A series of interconnected openings 54 for forming the springs 16 can be, for example, 25 μm wide with a length of each spring 16 being up to a few millimeters or more, and with a cross arm 56 interconnecting a pair of springs 16 on each side of the shuttle 14 being, for example, 50 μm wide. The contact springs 62, which are folded as shown in FIG. 7, can have a width of, for example, 25-50 μm.

A series of square posts 58 formed from the positive or negative tone resist are provided in the mask 52 at the locations wherein the permanent magnets 18 will later be formed. Each post 58 can be, for example, 50 μm square to form permanent magnets 18 of the same dimensions. In other embodiments of the present invention, a 2-D array of permanent magnets can be formed with a circular, elliptical, or polygon shape, or with any arbitrary shape.

In the example of FIGS. 7-8, the supports 24 can be laterally tapered to allow for movement of the springs 16 in the direction indicated by the arrow in FIG. 7. Additionally, the springs 16 can be attached to an end of the supports 24 proximate to the shuttle 14.

Figure 9D:
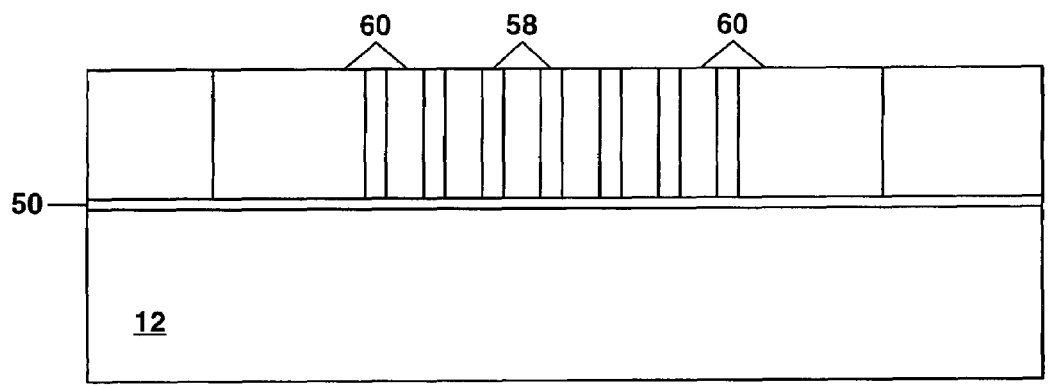

In FIG. 9D, a metal 60 such as nickel or an alloy thereof (e.g. NiFe) can be electroplated to fill in the openings 54 to build up the structures of the shuttle 14 and one or more spring contacts 62 thereon (see FIG. 7); the springs 16 and cross arms 56; and the supports 24. Any of the metal 60 extending upward beyond the openings 54 after the electroplating step can be removed using a lapping step.

Figure 9E:
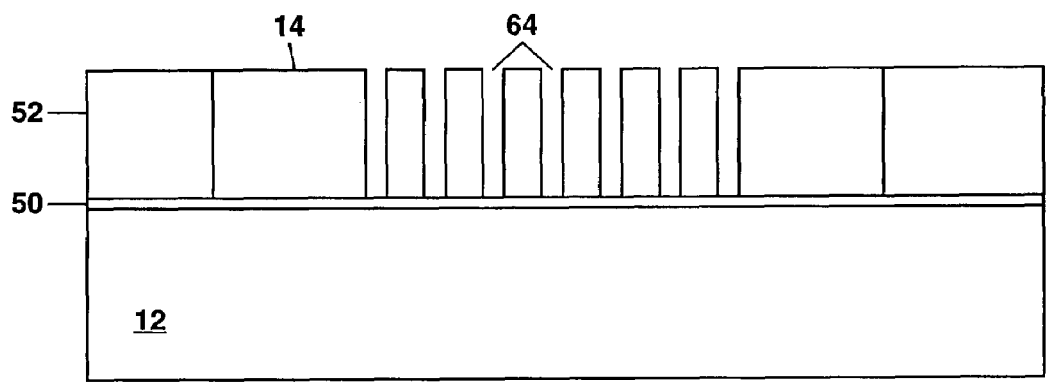

In FIG. 9E, the positive or negative tone resist mask 52 can be removed at the locations where the permanent magnets 18 are to be formed in the shuttle 14. This can be done by an additional x-ray exposure and developing step when the mask 52 comprises a positive tone resist (e.g. PMMA). Alternately, when a negative tone resist (e.g. NFR-015) is used, this resist can be stripped from the substrate 12, and another negative tone resist of the same type can be spun on over the entire top surface of the substrate 12 and then exposed, and selectively removed to form the openings 64.

Figure 9F:
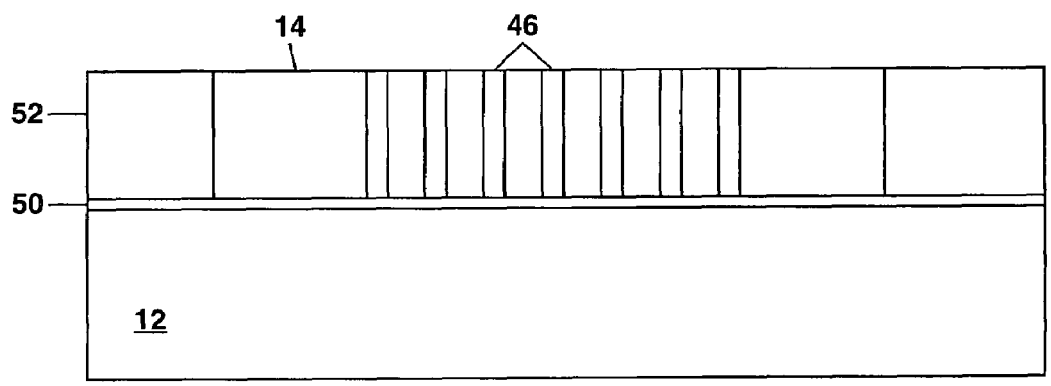

In FIG. 9F, a magnetic material 46 can be inserted into the openings 64 as previously described with reference to FIG. 4F. The magnetic material 46 can also be provided as a plurality of rods (e.g. comprising a magnetic alloy or a sintered magnetic material such as NdFeB or SmCo) in a magnetized or unmagnetized state which can be ground to shape and then pressed into the openings 64 or attached therein with an adhesive (e.g. epoxy). This can be done, for example, using a conventional automated robotic pin insertion tool. Any of the magnetic material 46 extending above the shuttle 14 can be removed using another lapping step.

Figure 9G:
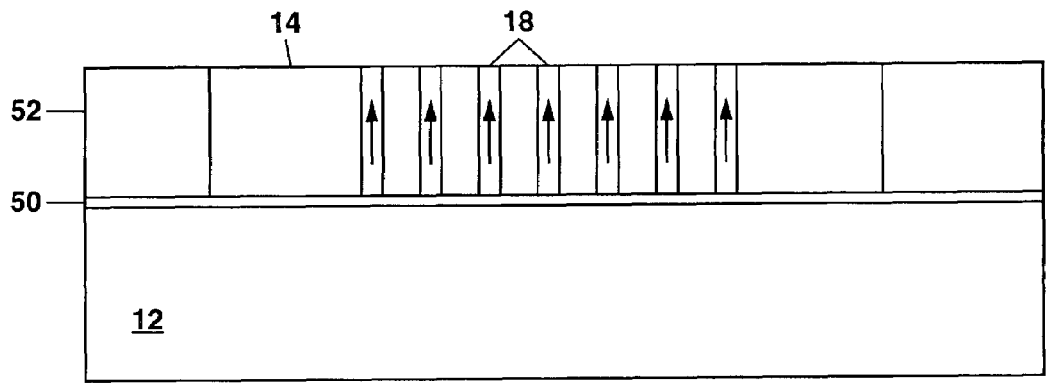

In FIG. 9G, the magnetic material 46 can be magnetized as described previously with reference to FIG. 4J to form the permanent magnets 18. This step can be omitted when a plurality of pre-magnetized rods have been inserted into the openings 64 as described above.

Figure 9H:
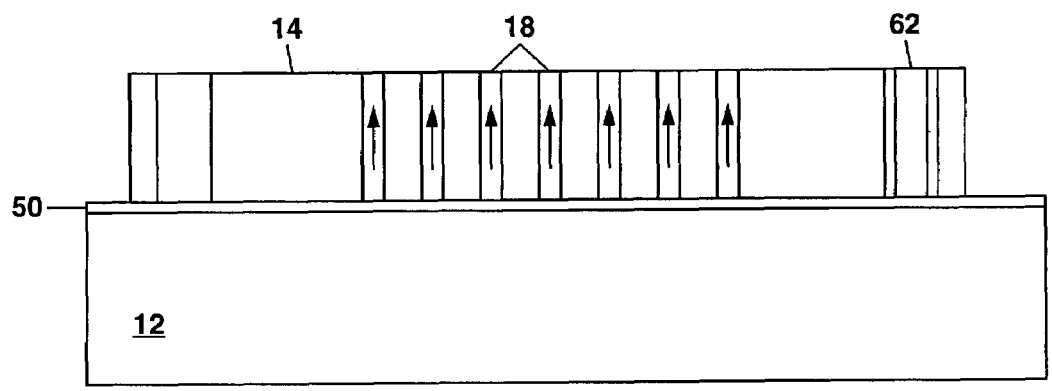

In FIG. 9H, the mask 52 can be removed completely. This can be done using acetone or a commercial resist remover.

Figure 9I:
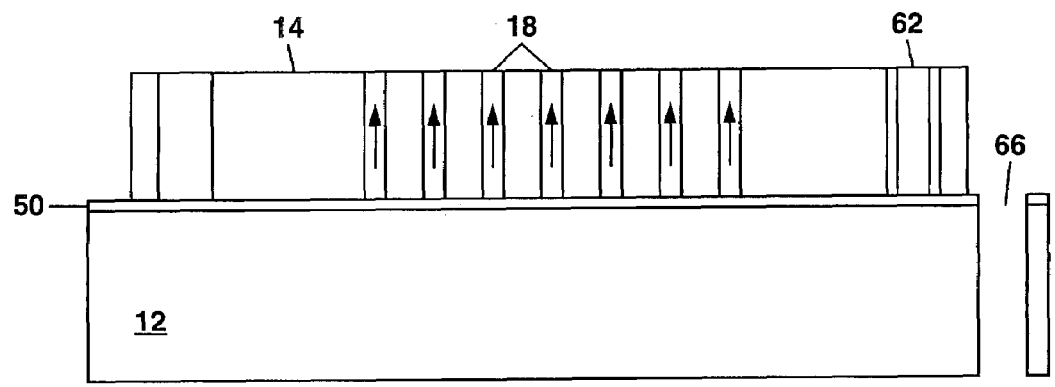
Figure 10:
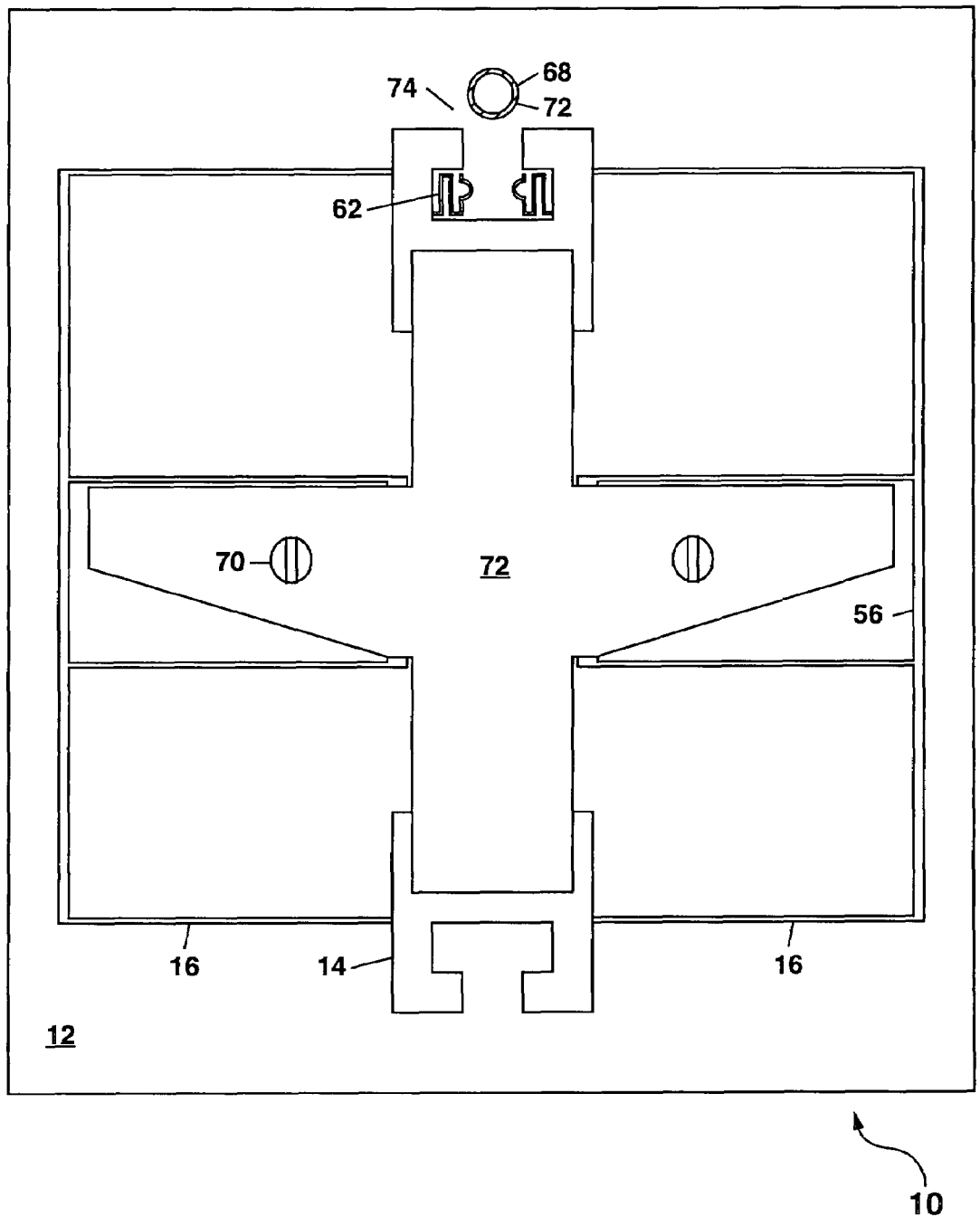
FIG. 10 shows a schematic plan view of the device of FIGS. 7 and 8 with a metal plate overlying the shuttle to provide additional eddy-current damping of the movement of the shuttle in response to an acceleration-time event.

In FIG. 9I, a hole 66 can be drilled through the substrate 12 and sacrificial layer 50 in preparation for inserting a contact pin 68. Additional holes 66 (not shown) can be drilled through the supports 24 and partially or completely through the substrate 12, as needed, for insertion of additional pins or screws 70 to provide for the attachment of an optional metal plate 72 above the shuttle 14 as shown in FIG. 10, and to provide an external electrical connection to the supports 24, or to the substrate 12. The optional metal plate 72 in FIG. 10 is useful to increase the eddy-current damping force $F_d$ by utilizing the magnetic flux $\phi$ 20 which extends upward beyond the permanent magnets 18, and to balance the eddy-current damping force $F_d$ produced by the electrically-conductive substrate 12. The optional metal plate 72 can comprise, for example, copper up to a few hundred microns thick, and can be spaced generally a few microns above the shuttle 14 to allow for movement of the shuttle 14. In other embodiments of the present invention, the metal plate 72 can be a part of a package. The metal plate 72 can also be attached to the supports 24 or to the substrate 12 using solder, epoxy, or diffusion bonding.

Figure 9J:
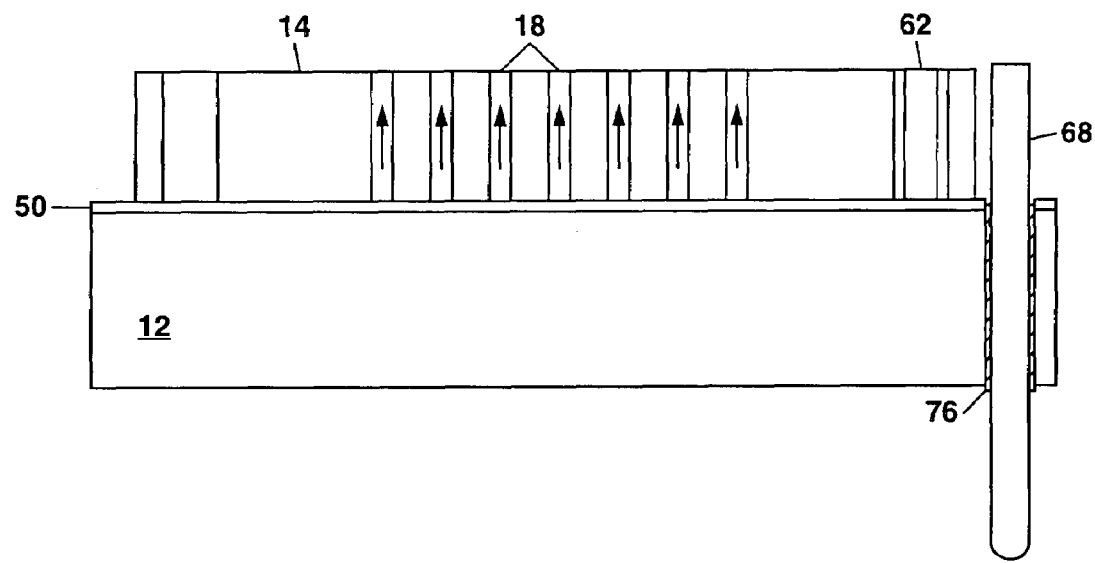

In FIG. 9J, the contact pin 68 is inserted into the hole 66 through the substrate 12, with an insulating sleeve 76 (e.g. comprising a polymer material such as a plastic) providing electrical insulation between the contact pin 68 and the substrate 12. The contact pin 68 can be held in place by an interference fit, or with an adhesive (e.g. epoxy). The contact pin 68 can be coated with a noble metal (e.g. gold) prior to or after insertion into the hole 66 through the substrate 12. The contact springs 62 can also include a layer of a noble metal (e.g. gold) to provide an enhanced electrical contact performance. The noble metal can be deposited on the contact spring 62 by electroplating, or alternately by evaporation or sputtering through a shadow mask.

Figure 9K:
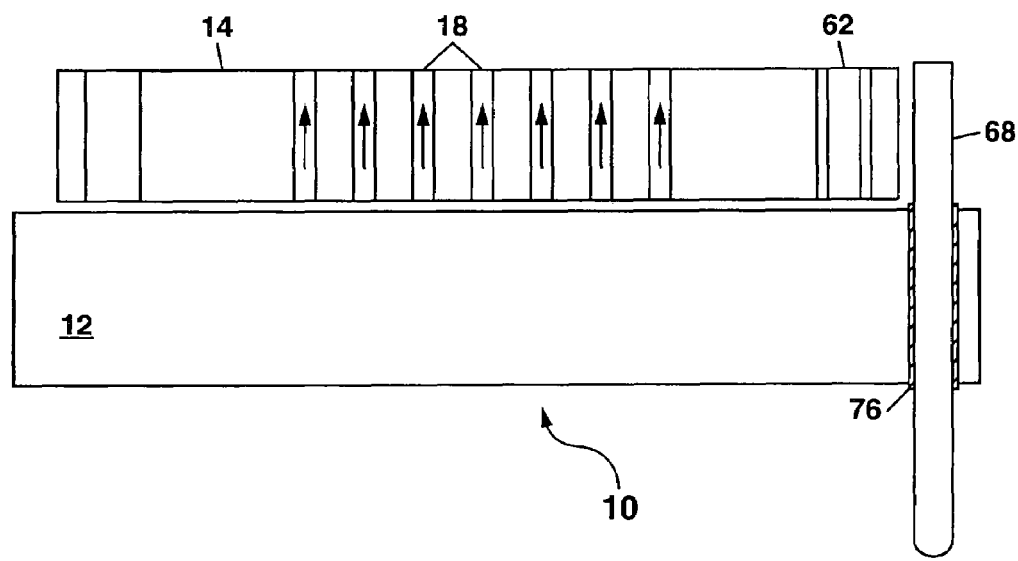

In FIG. 9K, the sacrificial layer 50 is removed from underneath the shuttle 14 and springs 16 to release these elements for movement. The sacrificial layer 50 can be left largely or entirely intact underneath the supports 24. This can be done, for example, by providing a plurality of regularly-spaced etch access holes (not shown) through the shuttle 14 to hasten the removal of the sacrificial layer 50 therebeneath, with each access hole being, for example, round or square with a width of 5-10 µm. These etch access holes can be formed, for example, by masking the location of each access hole when the mask 52 is photolithographically patterned as previously described with reference to FIG. 9C, thereby preventing the metal or metal alloy from being built up by electroplating at the locations of the access holes. The supports 24 can also be formed with a relatively large surface area as shown in FIG. 7 to limit undercutting of the sacrificial layer 50 therebeneath so that a portion of the sacrificial layer 50 is retained to attach the supports 24 to the substrate 12. The copper sacrificial layer 50 can be removed, for example, using a commercial copper etchant (e.g. Enthone Corp. ENSTRIP C38), or other copper etchants known to the art which remove copper without substantially chemically attacking other materials forming the MEM apparatus 10 including the permanent magnets 18 and metals including nickel or nickel alloys (e.g. an etchant comprising a 1:1 mixture of $NH_4OH$ and $H_2O_2$).

In the MEM apparatus 10 in the examples of FIGS. 7-8 and 10, an electrical switch 74 is formed by the combination of the spring contacts 62 and the contact pin 68, with the spring contacts 62 being electrically connected through the springs 16 to the supports 24, or to the substrate 12 (e.g. through one or more pins or screws 70, through one or more wire bonds, or by spot soldering the supports 24 to the substrate 12).

The switch 74 with the shuttle 14 in a rest position as shown in FIG. 7 is in a normally open position. A switch closure occurs in response to an acceleration-time event of sufficient magnitude and duration to move the shuttle 14 and spring contacts 62 towards the contact pin 68 and urge the spring contacts 62 against the contact pin 68. In other embodiments of the present invention, an electrical switch 74 can be formed at each end of the shuttle 14 for sensing of an acceleration-time event in each of two opposing directions (e.g. sensing the occurrence of both acceleration and deceleration).

In other embodiments of the present invention, the 2-D array of permanent magnets 18 can be located in the substrate 12, with a metal shuttle 14 (e.g. comprising copper) providing the eddy-current damping. In yet other embodiments of the present invention, the metal plate 72 above the shuttle 14 in FIG. 10 can be utilized as the sole basis for eddy-current damping of the shuttle 14 containing a plurality of permanent magnets 18. This can be done, for example, when the substrate 12 is nonconducting (e.g. when the substrate 12 comprises an insulating material such as glass, fused silica, quartz, or ceramic), or when the substrate 12 is semiconducting (i.e. when the substrate 12 comprises a semiconductor such as silicon). Fabrication of such a device can proceed in a manner similar to that previously described with reference to FIGS. 9A-9K. A metal seed layer can be deposited over a topside of the nonconducting or semiconducting substrate 12 in preparation for electroplating the copper sacrificial layer 50.

The various examples of the MEM apparatus 10 of the present invention can be batch fabricated so that up to one hundred or more devices 10 can be formed on a single substrate 12 and separated after fabrication for individual packaging. The individual packaging of each MEM device 10 described herein can be performed by hermetically packaging the MEM device 10 at an ambient pressure, or under a reduced pressure or vacuum in order to reduce a viscous damping on the movement of the shuttle 16 produced by an ambient pressure. Those skilled in the art will also understand that the MEM apparatus 10 of the present invention can be fabricated using other types of substrate materials as known to the art including substrates comprising semiconductors, glass, fused silica, quartz, ceramic, metal and metal alloys.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A microelectromechanical (MEM) apparatus, comprising:
   (a) a substrate holding a plurality of permanent magnets;
   (b) an electrically-conductive shuttle suspended above the substrate by a plurality of springs, with the electrically-conductive shuttle being moveable along a path in the plane of the substrate in response to an acceleration of the MEM apparatus, and with a movement of the electrically-conductive shuttle in response to the acceleration being damped by eddy currents produced therein in response to the movement of the electrically-conductive shuttle relative to each permanent magnet on the substrate; and
   (c) an electrical switch which is operable upon movement of the shuttle along the path in response to the acceleration.

2. The apparatus of claim 1 wherein each permanent magnet comprises a rare-earth permanent magnet.

3. The apparatus of claim 2 wherein each rare-earth permanent magnet comprises a samarium-cobalt (SmCo) permanent magnet.

4. The apparatus of claim 2 wherein each rare-earth permanent magnet comprises a neodymium-iron-boron (Nd-FeB) permanent magnet.

5. The apparatus of claim 1 wherein the plurality of permanent magnets are arranged in a one-dimensional array, or in a two-dimensional array.

6. The apparatus of claim 1 wherein a north-south magnetic pole alignment of each permanent magnet is oriented in a direction substantially perpendicular to the plane of the substrate.

7. The apparatus of claim 1 wherein the electrically-conductive shuttle comprises a metal or metal alloy.

8. The apparatus of claim 1 wherein the electrical switch upon operation thereof switches from a normally-open position to a closed position.

9. The apparatus of claim 1 wherein the electrical switch is formed, at least in part, on the electrically-conductive shuttle.

10. The apparatus of claim 9 wherein the electrical switch comprises a first electrical contact on the shuttle, and a second electrical contact on the substrate.

11. The apparatus of claim 9 wherein the electrical switch comprises a pair of electrical contacts on the substrate and an electrical conductor on the shuttle to complete an electrical circuit between the pair of electrical contacts upon movement of the shuttle along the path.

* * * * *